United States Patent
Gitlin et al.

(10) Patent No.: US 10,587,999 B2
(45) Date of Patent: *Mar. 10, 2020

(54) ENABLING SLOTTED ALOHA-NOMA FOR MASSIVE MACHINE-TO-MACHINE (M2M) COMMUNICATION IN INTERNET OF THING (IOT) NETWORKS

(71) Applicants: Richard D. Gitlin, Tampa, FL (US); Mohamed H. Elkourdi, Tampa, FL (US); Asim M. Mazin, Tampa, FL (US)

(72) Inventors: Richard D. Gitlin, Tampa, FL (US); Mohamed H. Elkourdi, Tampa, FL (US); Asim M. Mazin, Tampa, FL (US)

(73) Assignee: University of South Florida, Tampa, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/222,497

(22) Filed: Dec. 17, 2018

(65) Prior Publication Data

US 2019/0313225 A1 Oct. 10, 2019

Related U.S. Application Data

(60) Provisional application No. 62/653,887, filed on Apr. 6, 2018.

(51) Int. Cl.
*H04W 4/70* (2018.01)
*H04L 12/66* (2006.01)
(Continued)

(52) U.S. Cl.
CPC ............ *H04W 4/70* (2018.02); *H04B 7/0413* (2013.01); *H04J 15/00* (2013.01); *H04L 12/66* (2013.01);
(Continued)

(58) Field of Classification Search
CPC combination set(s) only.
See application file for complete search history.

(56) References Cited

U.S. PATENT DOCUMENTS 10,327,123 B1* 6/2019 Gitlin .................... H04W 52/00
2015/0351043 A1* 12/2015 De Gaudenzi ........ H04W 52/10
370/329

(Continued)

OTHER PUBLICATIONS

Al Rabee et al., The optimum received power levels of uplink non-orthogonal multiple access (NOMA) signals. IEEE Wireless and Microwave Technology Conference (WAMICON). 2017. Cocoa Beach, Fl, USA: 1-4.

(Continued)

*Primary Examiner* — Jason E Mattis
(74) *Attorney, Agent, or Firm* — Molly L. Sauter; Smith & Hopen, P.A.

(57) ABSTRACT

Slotted Aloha-NOMA (SAN) protocol is an uncoordinated, non-orthogonal, random access protocol that exploits the simplicity of SA (Slotted Aloha) and the superior throughput of non-orthogonal multiple access (NOMA) and its ability to resolve collisions via use of successive interference cancellation (SIC) receiver. In SAN protocol, the SIC receiver at the IoT gateway adaptively learns the number of active devices (which is not known a priori) using multiple hypothesis testing in order to successfully distinguish between signals transmitted from different IoT devices.

20 Claims, 5 Drawing Sheets

(51) Int. Cl.
    *H04B 7/0413*     (2017.01)
    *H04L 29/08*     (2006.01)
    *H04J 99/00*     (2009.01)
    *H04W 52/02*     (2009.01)
    *H04W 74/08*     (2009.01)
    *H04W 52/00*     (2009.01)

(52) U.S. Cl.
    CPC ............ *H04L 67/12* (2013.01); *H04W 52/00* (2013.01); *H04W 52/0219* (2013.01); *H04W 74/0833* (2013.01)

(56) References Cited

U.S. PATENT DOCUMENTS

| | | | | |
|---|---|---|---|---|
| 2016/0127092 | A1* | 5/2016 | Zhang | H04L 5/0048 370/329 |
| 2016/0191115 | A1* | 6/2016 | Sano | H04W 16/28 375/144 |
| 2018/0109299 | A1* | 4/2018 | Benjebbour | H04B 7/04 |
| 2018/0234926 | A1* | 8/2018 | Lázaro Blasco | H04W 52/20 |
| 2018/0249358 | A1* | 8/2018 | Ratasuk | H04W 24/10 |

OTHER PUBLICATIONS

Balevi et al., Aloha-NOMA for Massive Machine-to-Machine IoT Communication. IEEE International Conference on Communications (ICC). 2018: 1-5.

Saito et al., Non-orthogonal multiple access (NOMA) for cellular future radio access. Proc. IEEE Veh. Technol. Conf. (VTC Spring). 2013: 1-5.

Choi. NOMA-based random access with multichannel Aloha. IEEE Journal on Selected Areas in Communications. 2017. vol. 35 (No. 12): 2736-2743.

Shen and Li. Performance analysis for a stabilized multichannel slotted Aloha algorithm. 14th IEEE 2013 International Symposium on Personal, Indoor and Mobile Radio Communication Proceedings (PIMRC). 2003. vol. 1: 249-253.

Elkourdi et al., Enabling Aloha-NOMA for Massive M2M Communication in IoT Networks. Accepted 2018 IEEE Wireless and Microwave Technology Conference (WAMICON). 2018: 1-4.

* cited by examiner

Successive Interference Cancellation (SIC) Receiver

ENABLING SLOTTED ALOHA-NOMA FOR MASSIVE MACHINE-TO-MACHINE (M2M) COMMUNICATION IN INTERNET OF THING (IOT) NETWORKS

CROSS-REFERENCE TO RELATED APPLICATIONS

This application claims priority to U.S. Provisional Patent Application No. 62/653,887 filed on Apr. 6, 2018, entitled "Enabling Slotted Aloha-Noma for Massive Machine-To-Machine (M2M) Communication in Internet of Thing (IOT) Networks", which is incorporated by reference herein in its entirety.

BACKGROUND OF THE INVENTION

The Internet of things (IoT), which is the network of physical devices embedded with sensors, actuators, and connectivity, is being accelerated into the mainstream by the emergence of 5G wireless networking. The rapid growth of both the number of connected devices and the data volume that is expected to be associated with the Internet of Things (IoT) applications, has increased the popularity of Machine-to-Machine (M2M) type communication within 5G wireless communication systems. Uncoordinated random-access schemes have attracted lots of attention in the standards of cellular networks as a possible method for making a massive number of M2M communications possible with a low signaling overhead.

Uncoordinated random access protocols have attracted increased attention as a possible method for enabling massive numbers of M2M communications of short packets possible with a low signaling overhead. However, while uncoordinated medium access protocols, such as Aloha and slotted Aloha (SA), perform well in small networks, they cannot provide sufficient throughput in networks with large numbers of IoT devices transmitting simultaneously over a shared medium, due to the numerous collisions at the IoT gateway.

Accordingly, in view of the art considered as a whole at the time the present invention was made, it was not obvious to those of ordinary skill in the field of this invention how the problem of connecting a large number of low-complexity and power-limited IoT devices over a shared wireless medium could be overcome.

BRIEF SUMMARY OF THE INVENTION

The Slotted Aloha-NOMA (SAN) protocol of the present invention, addresses the problem of connecting many low-complexity and power-limited IoT devices over a shared wireless medium via an IoT gateway, without any human intervention. It also addresses assigning distinct optimum power levels in dynamic environments as a subproblem via use of a flexible frame structure, where the number of active IoT devices is continuously changing.

In various embodiments, the present invention provides an uncoordinated, non-orthogonal, random-access protocol, which provides high throughput, while also being matched to the low complexity requirements and the sporadic traffic pattern of IoT devices.

In one embodiment, the present invention provides, a method for Machine-to-Machine (M2M) communication over a transmission medium. The method includes, broadcasting a notification signal, from an Internet of Things (IoT) gateway, to notify a plurality of IoT devices that the IoT gateway is available to receive transmission packets over the transmission medium. The method further includes, transmitting a training sequence over the transmission medium from each active IoT device of the plurality of devices in response to the notification signal and receiving a superposed signal at the IoT gateway, wherein the superposed signal comprises each of the training sequences transmitted from each active IoT device. The method further includes, determining, by the IoT gateway, a number of active IoT devices based upon the received superposed signal. If the number of active IoT devices is less than or equal to a maximum number of optimum power levels of a Successive Interference Cancellation (SIC) receiver of the IoT gateway, a number of optimum power levels of the SIC receiver is set to be equal to the number of active IoT devices and the number of optimum power levels of the SIC receiver are broadcasted to the active IoT devices. Alternatively, if the number of active IoT devices is greater than a maximum number of optimum power levels of the SIC receiver, the method continues by aborting the setting of the number of optimum power levels of the SIC receiver and broadcasting a next notification signal comprising a random back-off request, to notify the plurality of IoT devices that the IoT gateway is available to receive transmission packets over the transmission medium and to request that the active IoT devices utilize a random back-off in a next transmission of the training sequence over the transmission medium.

If the number of active IoT devices is less than or equal to the number of optimum power levels of the SIC receiver, the method continues by receiving, at each of the active IoT devices, the number of optimum power levels of the SIC receiver, electing, by each of the active IoT devices, one of the optimum power levels of the SIC receiver and one of a plurality of receiving antennas of the SIC receiver and transmitting, by each of the active IoT devices, a device identification associated with the active IoT device and a payload, the payload comprising the selected optimum power level of the SIC receiver and the selected receiving antenna of the SIC receiver. After receiving the device identification and payload from each of the active IoT devices, the method continues by, determining if the selected optimum power level of each of the active IoT devices is distinct and establishing a connection between each of the active IoT devices and the SIC receiver if the selected optimum power level of each of the active IoT devices is distinct. Alternatively, if the selected optimum power level of each of the active IoT devices is not distinct, the method continues by not establishing a connection between each of the active IoT devices and transmitting a reselect signal to each of the active IoT devices to reselect an optimum power level. The steps of selecting optimum power levels is repeated until the selected optimum power levels are determined to be distinct or until a maximum number of attempts is exceeded. If the maximum number of attempts is exceeded without attaining distinct optimum power levels, the method continues by transmitting, from the IoT gateway a negative-acknowledgement signal to each of the active IoT devices instructing each of the IoT devices to utilize a random back-off in a next transmission of the training sequence over the transmission medium.

In one embodiment, the IoT gateway determines a number of active IoT devices utilizing multi-hypothesis testing of the received superposed signal.

In an additional embodiment, the present invention provides a system for Machine-to-Machine (M2M) communication over a transmission medium which includes, a transmitter for broadcasting a notification signal over a transmission medium to notify a plurality of IoT devices that an IoT gateway is available to receive transmission packets over the transmission medium and a receiver. The receiver for receiving a superposed signal at the IoT gateway, wherein the superposed signal comprises a training sequence transmitted from each active IoT device of the plurality of IoT devices, for determining a number of active IoT devices based upon the received superposed signal, for setting a number of optimum power levels of a Successive Interference Cancellation (SIC) receiver of the IoT gateway to be equal to the number of active IoT devices, if the number of active IoT devices is less than or equal to a maximum number of optimum power levels of the SIC receiver and for broadcasting the number of optimum power levels of the SIC receiver to the active IoT devices.

The receiver is further for aborting the setting of the number of optimum power levels of the SIC receiver if the number of active IoT devices is greater than a maximum number of optimum power levels of the SIC receiver and for broadcasting a next notification signal comprising a random back-off request, to notify a plurality of IoT devices that the IoT gateway is available to receive transmission packets over the transmission medium and to request that the active IoT devices utilize a random back-off in a next transmission of the training sequence over the transmission medium.

The receiver is further for receiving, from each active IoT device, a device identification associated with the active IoT device and a payload, the payload comprising a selected optimum power level of the SIC receiver and a selected receiving antenna of the SIC receiver, for determining if the selected optimum power level of each of the active IoT devices is distinct and for establishing a connection between each of the active IoT devices and the SIC receiver if the selected optimum power level of each of the active IoT devices is distinct.

The receiver is additionally for not establishing a connection between each of the active IoT devices and the SIC receiver if the selected optimum power level of each of the active IoT devices is not distinct, for transmitting a reselect signal, from the IoT gateway, to each of the active IoT devices to reselect an optimum power level and a receiving antenna, for receiving, from each of the active IoT devices, a device identification associated with the active IoT device and a reselected payload at the SIC receiver, the reselected payload comprising a reselected optimum power level of the SIC receiver and the selected receiving antenna of the SIC receiver, for determining if the reselected optimum power level of each of the active IoT devices is distinct, for repeating transmitting a reselect signal from the IoT gateway, receiving a device identification and a reselected payload from each of the active IoT devices at the SIC receiver and determining if the reselected optimum power level of each of the active IoT devices is distinct until the reselected optimum power each of the active IoT devices is determined to be distinct or until a maximum number of attempts has been exceeded and for transmitting a negative-acknowledgement signal to each of the active IoT devices instructing each of the IoT devices to utilize a random back-off in a next transmission of the training sequence over the transmission medium if the maximum number of attempts is exceeded.

In one embodiment, the receiver is further for determining a number of active IoT utilizing multi-hypothesis testing of the received superposed signal.

In an additional embodiment, the present invention provides a computer program product comprising computer executable instructions embodied on a non-transitory computer-readable medium for performing steps which include, broadcasting a notification signal to notify a plurality of IoT devices that an IoT gateway is available to receive transmission packets over the transmission medium, receiving a superposed signal comprising a training sequence transmitted by each active IoT device of the plurality of IoT devices in response to the notification signal, determining a number of active IoT devices based upon the received superposed signal, setting a number of optimum power levels of a Successive Interference Cancellation (SIC) receiver to be equal to the number of active IoT devices if the number of active IoT devices is less than or equal to a maximum number of optimum power levels of the SIC receiver and broadcasting the number of optimum power levels of the SIC receiver to the active IoT devices.

The computer program is further for aborting, by the IoT gateway, the setting of the number of optimum power levels of the SIC receiver if the number of active IoT devices is greater than a maximum number of optimum power levels of the SIC receiver and broadcasting a next notification signal, comprising a random back-off request, to notify the plurality of IoT devices that the IoT gateway is available to receive transmission packets over the transmission medium and to request that the active IoT devices utilize a random back-off in a next transmission of the training sequence over the transmission medium.

The computer program product is additionally for, receiving, from each active IoT device, a device identification associated with the active IoT device and a payload, the payload comprising a selected optimum power level of the SIC receiver and a selected receiving antenna of the SIC receiver, for determining if the selected optimum power level of each of the active IoT devices is distinct and for establishing a connection between each of the active IoT devices and the SIC receiver if the selected optimum power level of each of the active IoT devices is distinct.

The computer program product is further for, not establishing a connection between each of the active IoT devices and the SIC receiver if the selected optimum power level of each of the active IoT devices is not distinct, for transmitting a reselect signal to each of the active IoT devices to reselect an optimum power level and a receiving antenna, for receiving, from each of the active IoT devices, a device identification associated with the active IoT device and a reselected payload at the SIC receiver, the reselected payload comprising a reselected optimum power level of the SIC receiver and the selected receiving antenna of the SIC receiver, for determining if the reselected optimum power level of each of the active IoT devices is distinct, for repeating transmitting a reselect signal from the IoT gateway, receiving a device identification and a reselected payload from each of the active IoT devices at the SIC receiver and determining if the reselected optimum power level of each of the active IoT devices is distinct until the reselected optimum power each of the active IoT devices is determined to be distinct or until a maximum number of attempts has been exceeded and for transmitting a negative-acknowledgement signal to each of the active IoT devices instructing each of the IoT devices to utilize a random back-off in a next transmission of the training sequence over the transmission medium if the maximum number of attempts is exceeded.

In a particular embodiment, the computer program product determines a number of active IoT devices by utilizing multi-hypothesis testing of the received superposed signal.

Under ideal conditions it has been shown that SAN, using power-domain orthogonality, can significantly increase the throughput using SIC (Successive Interference Cancellation) to enable correct reception of multiple simultaneously transmitted signals. For this ideal performance, the enhanced SAN receiver adaptively learns the number of active devices, which is not known a priori, using a form of multi-hypothesis testing. For small numbers of simultaneous transmissions, it is shown that there can be substantial throughput gain of 5.5 dB relative to pure Slotted Aloha (SA) for 0.07 probability of transmission and up to 3 active transmitters.

Accordingly, the present invention provides an improved system and method for connecting a large number of low-complexity and power-limited IoT devices over a shared wireless medium.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In various embodiments, the present invention advances a novel MAC protocol, referred to as Slotted-Aloha NOMA (SAN), which is matched to IoT/M2M applications and which is scalable, energy efficient and provides high throughput.

The present invention exploits the simplicity of SA (Slotted Aloha) and the superior throughput of non-orthogonal multiple access (NOMA) and its ability to resolve collisions utilizing a successive interference cancellation (SIC) receiver. The SAN protocol provided by the present invention and subsequent enhancements are a promising candidate MAC protocol that can be utilized for low complexity IoT devices.

The main bottleneck of Slotted-Aloha (SA) systems is the low throughput resulting from the high number of collisions. The present invention addresses this bottleneck by incorporating the concept of non-orthogonal multiple access (NOMA) in order to use the power domain to provide access for multiple IoT devices. In SAN, the signaling overhead is reduced in the detection phase of the proposed protocol where the number of active IoT devices are detected by the gateway using a form of multiple hypotheses testing. It is also an energy efficient protocol due to the fact that a Successive Interference Cancellation (SIC) receiver resolves collisions, and thus minimizes retransmission. In view of the current state of the art, the present invention increases the conventional pure SA throughput significantly.

The SAN protocol provided by the present invention is suitable for various scenarios where many IoT devices are transmitting to an IoT gateway simultaneously, on the same frequency, but with different power levels. In the present invention, the signals received at the IoT gateway can be separated via use of an SIC receiver.

Figure 1:
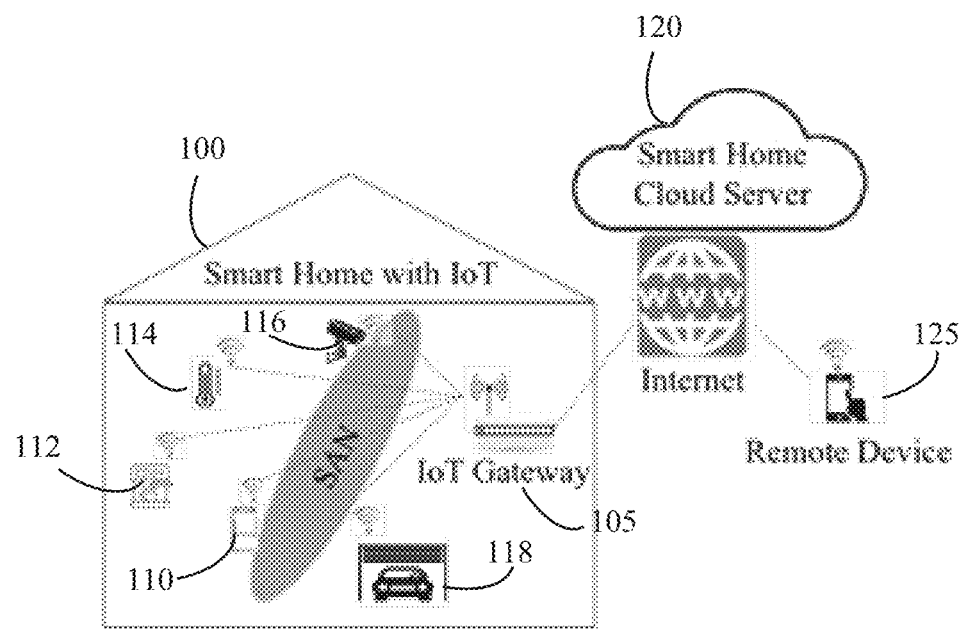
FIG. 1 is an illustration of a use case of the SAN protocol (Slotted-Aloha, Non-Orthogonal Multiple-Input Multiple-Output (NOMA)) protocol as implemented in a smart home with IoT, in accordance with an embodiment of the present invention.

An exemplary illustration of the SAN scenario of the present invention is depicted in FIG. 1 as a smart home 100 with an IoT network. In this model, IoT devices 110, 112, 114, 116, 118 send their data to the IoT gateway 105 using the SAN protocol and the IoT gateway 105 distinguishs the signals utilizing an SIC receiver. The IoT gateway 105 may then send data received from the IoT devices 110, 112, 114, 116, 118 to an Internet-based cloud server 120, which may be accessed by a remote device 125.

Figure 2:
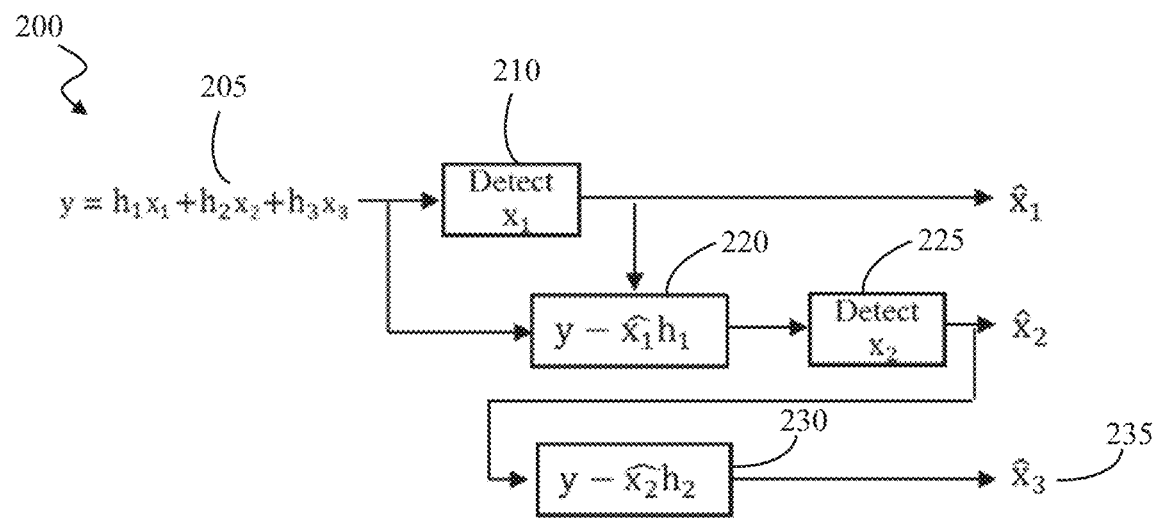
FIG. 2 is an illustration of Successive Interference Cancellation (SIC) receiver, in accordance with an embodiment of the present invention.

A SIC receiver has the ability to receive two or more signals, concurrently, that would otherwise cause a collision. In general, the SIC receiver is able to decode the stronger signal, subtract it from the combined signal, and extract the weaker one from the residue. As shown in FIG. 2 an SIC receiver 200 may receive a composite signal 205 comprising signals transmitted from three different IoT devices, along with the associated interference. The SIC receiver 200 detects the strongest signal (x1) 210 from the composite signal 205, and then subtracts the interference associated with x1 from the composite signal 220 to detect the second signal (x2) 225. The SIC receiver 200 then subtracts the interference associated with the second signal x2 from the composite signal 230 to detect the third signal (x3) 235.

One of the main challenges for enabling the practical implementation of the SAN protocol is the assignment of proper power levels for the IoT devices before transmitting the information. If the proper power levels for the IoT devices are not determined, the signals received from different IoT devices cannot be extracted successively from the composite received signal. This issue becomes more challenging in dynamic environments where the number of IoT devices with information ready to send is continuously changing.

In the present invention, this challenge is addressed via a flexible frame structure. Such a scheme provides great flexibility in adapting to changing network environments. This structure is opposite to that of Time Division Multiple Access (TDMA) or Frequency Division Multiple Access (FDMA) techniques in which a new user arrival can completely change the overall frame structure such that the additional user must be assigned at least one slot within the frame.

Figure 3:
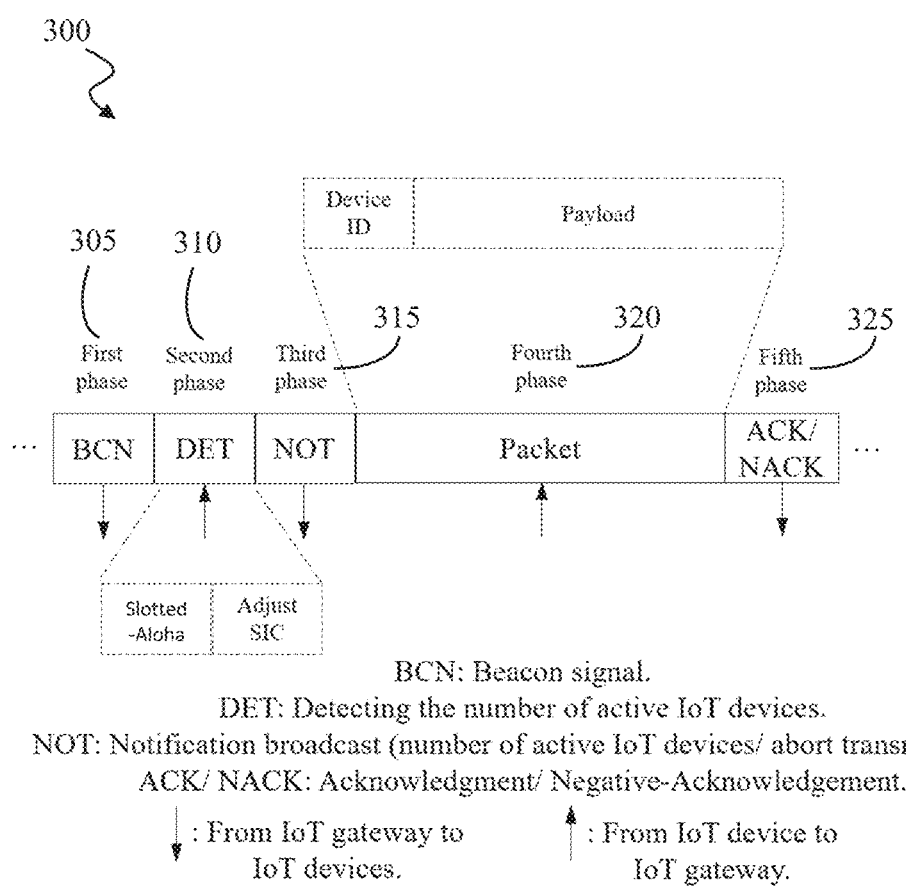
FIG. 3 is an illustration of the SAN protocol frame structure, in accordance with an embodiment of the present invention.

As illustrated in FIG. 3, the proposed frame structure 300 is composed of 5 phases. In the first phase 305, the IoT gateway transmits a beacon signal to announce its readiness to receive packets. In the second phase 310, the IoT devices with packets ready to transmit send a training sequence to aid the IoT gateway in detecting the number of active IoT devices in the transmission medium. The IoT gateway detects the number of devices requesting transmission via a form of multiple hypotheses testing and adjusts the degree of SIC receiver for the optimum power levels. In practice, the SIC receiver has a fixed range of optimum power levels (e.g. m=2, 3). If the IoT devices were registered with the gateway, instead of the using multi-hypothesis testing method of the present invention, implementation would be simpler, however, doing so would significantly increase the length of the control phase and thus decrease the payload, or throughput, considering the potentially large number of IoT devices. In the third phase 315, if the detected number of active IoT devices is not in the range of the total optimal power levels the IoT gateway aborts the transmission and starts the frame again by sending a new beacon signal and implying that the active transmitters utilize a random back-off in the next transmission. Alternatively, if the detected number of devices is in range of the SIC receiver, the IoT gateway broadcasts the degree of the SIC receiver to the transmitters and then each active IoT device randomly picks one of receiving antennas using a pre-calculated precoding matrix, and picks one of the optimum power levels.

In the fourth phase 320 the IoT device send packets, comprising a device ID and a payload, to the SIC receiver. If the choices at each of the receiving antennas are distinct, the SIC receiver can decode the self-identifying signals (device ID+payload) and then the gateway sends an acknowledgement (ACK) to the active IoT devices. However, if the active IoT devices did not select distinct power levels, the reselection process is repeated and after a few attempts, if there is no successful transmission, the IoT devices receive a negative-acknowledgment (NACK) and enter a random back-off mode. As such, in the fifth phase 325, the receiver sends an ACK or NACK to the IoT devices. This method improves fairness among the users and will allow for the possibility of fewer active users in the next session, which will improve the probability of successful transmission.

Figure 4:
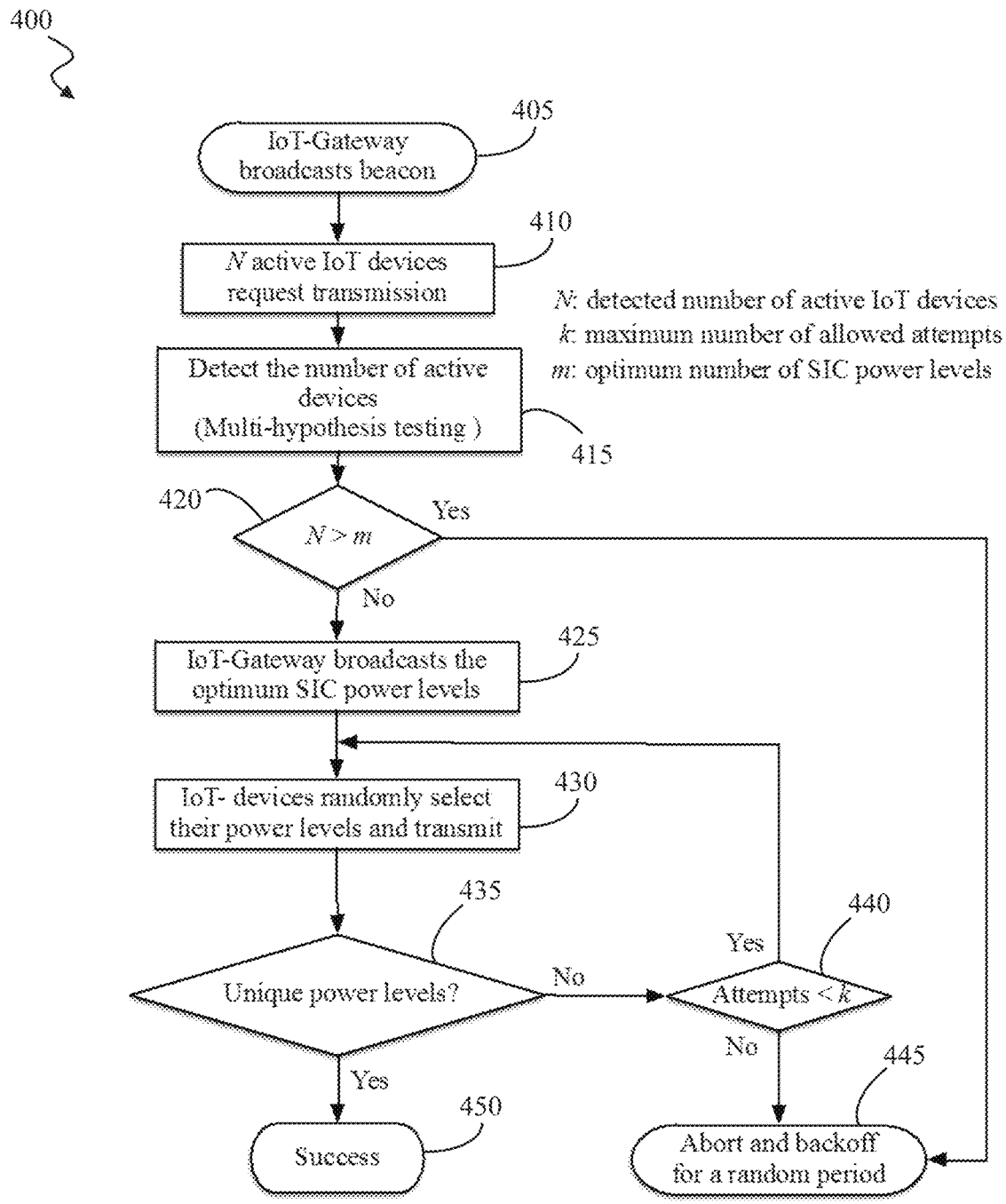
FIG. 4 is a flow diagram illustrating the SAN protocol phases, in accordance with an embodiment of the present invention.

FIG. 4 illustrates a flow diagram of the method of the present invention 400 for achieving M2M communication over a transmission medium. At a first step 405, the method includes, broadcasting a notification signal, from an Internet of Things (loT) gateway, to notify a plurality of IoT devices that the IoT gateway is available to receive transmission packets over the transmission medium. At a next step 410, each of the active IoT devices having packets ready to send over the transmission medium transmit a training sequence over the transmission medium in response to the notification signal. After receiving a superposed signal at the IoT gateway, wherein the superposed signal comprises each of the training sequences transmitted from each active IoT device, the method continues at the next step 415 by detecting the number of active IoT devices based upon the received superposed signal. In a particular embodiment, multi-hypothesis testing can be used to determine the number of active IoT device from the superposed signal.

Following the determination of the number of active IoT devices, the method continues at 420 by determining if the number of active IoT devices is less than or equal to a maximum number of optimum power levels of a Successive Interference Cancellation (SIC) receiver of the IoT gateway. If the number of active IoT devices is less than or equal to a maximum number of optimum power levels of the SIC receiver, the method continues at 425 by setting a number of optimum power levels of the SIC receiver to be equal to the number of active IoT devices and broadcasting, by the IoT gateway, the number of optimum power levels of the SIC receiver to the active IoT devices. Alternatively, If the number of active IoT devices is greater than a maximum number of optimum power levels of the SIC receiver, the method continues at 445 by aborting the transmission and broadcasting a next notification signal comprising a random back-off request, to notify the plurality of IoT devices that the IoT gateway is available to receive transmission packets over the transmission medium and to request that the active IoT devices utilize a random back-off in a next transmission of the training sequence over the transmission medium.

If the number of active IoT devices is less than or equal to a maximum number of optimum power levels of the SIC receiver, after setting a number of optimum power levels of the SIC receiver to be equal to the number of active IoT devices and broadcasting the number of optimum power levels of the SIC receiver to the active IoT devices, the method continues at 430 by receiving, at each of the active IoT devices, the number of optimum power levels of the SIC receiver, selecting, by each of the active IoT devices, one of the optimum power levels of the SIC receiver and one of a plurality of receiving antennas of the SIC receiver and transmitting, by each of the active IoT devices, a device identification associated with the active IoT device and a payload, the payload comprising the selected optimum power level of the SIC receiver and the selected receiving antenna of the SIC receiver. After transmitting the IoT power levels to the receiver, the method continues at 435 by determining if the selected optimum power level of each of the active IoT devices is distinct. If the selected optimum power level of each of the active IoT devices is distinct, the method continued at 450 by establishing a connection between each of the active IoT devices and the SIC receiver if the selected optimum power level of each of the active IoT devices is distinct.

Alternatively, if it is determined that the selected optimum power level of each of the active IoT devices is not distinct, the method continues at 440 by not establishing a connection between each of the active IoT devices and the SIC receiver and repeating the steps of transmitting and reselecting optimum power levels of the SIC receiver at each of the active IoT devices, until the reselected optimum power each of the active IoT devices is determined to be distinct or until a maximum number of attempts (<k) has been exceeded. If the maximum number of attempts has been exceeded, the method continues to step 445 where the connection is aborted and a negative-acknowledgement (NACK) signal to each of the active IoT devices instructing each of the IoT devices to utilize a random back-off in a next transmission of the training sequence over the transmission medium when a maximum number of attempts has been exceeded.

As previously described, a form of multiple hypothesis testing may be used to determine the number of active IoT devices from the composite signal received at the SIC receiver. The detection of active IoT devices starts in the second phase 310 of the SAN frame, as previously presented in FIG. 3.

After receiving the beacon, all the IoT devices send, at the same power level, a training sequence of length L using the SAN protocol. The superposed received signal at the IoT gateway from N active transmitting IoT devices is given by:

$$y = Hs + 2, \qquad (1)$$

where $H = [h_1, h_2, \ldots, h_N] \in \mathbb{R}^{1 \times N}$ and $h_n$ is the channel gain between the nth IoT device and the IoT gateway. $s \in \mathbb{R}^{N \times L}$ is the transmit sequence (e.g. BPSK) from N IoT active devices and $w \in \mathbb{R}^{1 \times L}$ is the additive white Gaussian noise with zero mean and variance $\sigma^2$. The multiple hypothesis test is used to detect the number of N active IoT devices from the total M IoT device. The following procedure is used to sequentially detect the number of active devices:

$\mathcal{H}_0$: Received signal contains only noise y=w $\mathcal{H}_1$: Received signal contains data from at least one IoT device $$y = h_1 s_1 + w, \quad (2)$$

$\mathcal{H}_N$: Received signal contains data from at most N IoT device y=Hs+w, We assume $h_n=1$, $\forall n \in \{1, 2, \ldots, N\}$. Following the Neyman-Pearson (NP) test, we can write the Likelihood Ration (LR) testing [10] $\mathcal{H}_N$ vs. $\mathcal{H}_{N-1}$ as:

$$\frac{p\left(y; \sum_{n=1}^{N} s_n, H_N\right)}{p\left(y; \sum_{n=1}^{N-1} s_n, H_{N-1}\right)} = \quad (3)$$

$$\frac{\exp\left[\frac{1}{2\sigma^2}\left(y - \sum_{n=1}^{N} h_n s_n\right)^T \left(y - \sum_{n=1}^{N} h_n s_n\right)\right]}{\exp\left[\frac{1}{2\sigma^2}\left(y - \sum_{n=1}^{N-1} h_n s_n\right)^T \left(y - \sum_{n=1}^{N-1} h_n s_n\right)\right]} \overset{\mathcal{H}_N}{\underset{\mathcal{H}_{N-1}}{\gtrless}} \gamma,$$

$N = 1, \ldots M$ where $s \in \mathbb{R}^{1 \times L}$ is the transmitted sequence from the $n^{th}$ IoT device. By taking the logarithm, (3) is simplified to:

$$T(y) = \frac{1}{L} \sum_{l=0}^{L-1} y \overset{\mathcal{H}_{N-1}}{\underset{\mathcal{H}_N}{\gtrless}} \quad (4)$$

$$\frac{2\sigma^2 \ln \gamma - \left[\left(\sum_{n=1}^{N-1} h_n s_n\right)\left(\sum_{n=1}^{N-1} h_n s_n\right)^T + \left(\sum_{n=1}^{N} h_n s_n\right)\left(\sum_{n=1}^{N} h_n s_n\right)^T\right]}{-2\left(\sum_{n=1}^{N-1} h_n s_n + \sum_{n=1}^{N} h_n s_n\right)} = \gamma'$$

The NP detector, or the test statistic in (4) compares the sample mean of the received signal to the threshold γ' to decide on a hypothesis $\mathcal{H}_N$ or $\mathcal{H}_{N-1}$. The NP test terminates if the number of detecting devices exceeds the SIC receiver optimum power levels, which are 3 levels in this embodiment. To compute the threshold γ' in (4) for a desired probability of false alarm $P_{FA}$, which occurs when deciding $\mathcal{H}_N$ if the test in (4) is greater than the threshold γ', so that $P_{FA}$ can be written as:

$$P_{FA} = P(T(y) > \gamma'; \mathcal{H}_N) \quad (5)$$

Since the test in (4) under both hypothesis is a Gaussian distribution, that $$T(y) \sim \mathcal{N}\left(\sum_{l=0}^{L-1}\sum_{n=1}^{N-1} s_n, \frac{\sigma^2}{L}\right) \text{ under}$$

$\mathcal{H}_{N-1}$ and $T(y) \sim \mathcal{N}\left(\sum_{l=0}^{L-1}\sum_{n=1}^{N} s_n, \frac{\sigma^2}{L}\right)$ under $\mathcal{H}_N$ (5) is rewritten as:

$$P_{FA} = Q\left(\frac{\gamma' - \sum_{l=0}^{L-1}\sum_{n=1}^{N} s_n}{\sqrt{\sigma^2/L}}\right) \quad (6)$$

Thus, the threshold γ' is given by:

$$\gamma' = Q^{-1}(P_{FA})\sqrt{\sigma^2/L} + \Sigma_{l=0}^{L-1}\Sigma_{n=1}^{N} s_n \quad (7)$$

Following the same steps, the probability of detecting the number of active devices is:

$$P_D = Q\left(\frac{\gamma' - \sum_{l=0}^{L-1}\sum_{n=1}^{N-1} s_n}{\sqrt{\sigma^2/L}}\right) \quad (8)$$

From (7), (8), the $P_D$ can be written as a function of energy to noise ratio as:

$$P_D = Q\left(Q^{-1}(P_{FA}) + \frac{\sum_{l=0}^{L-1}\sum_{n=1}^{N} s_n - \sum_{l=0}^{L-1}\sum_{n=1}^{N-1} s_n}{\sqrt{\sigma^2/L}}\right) \quad (9)$$

Figure 5:
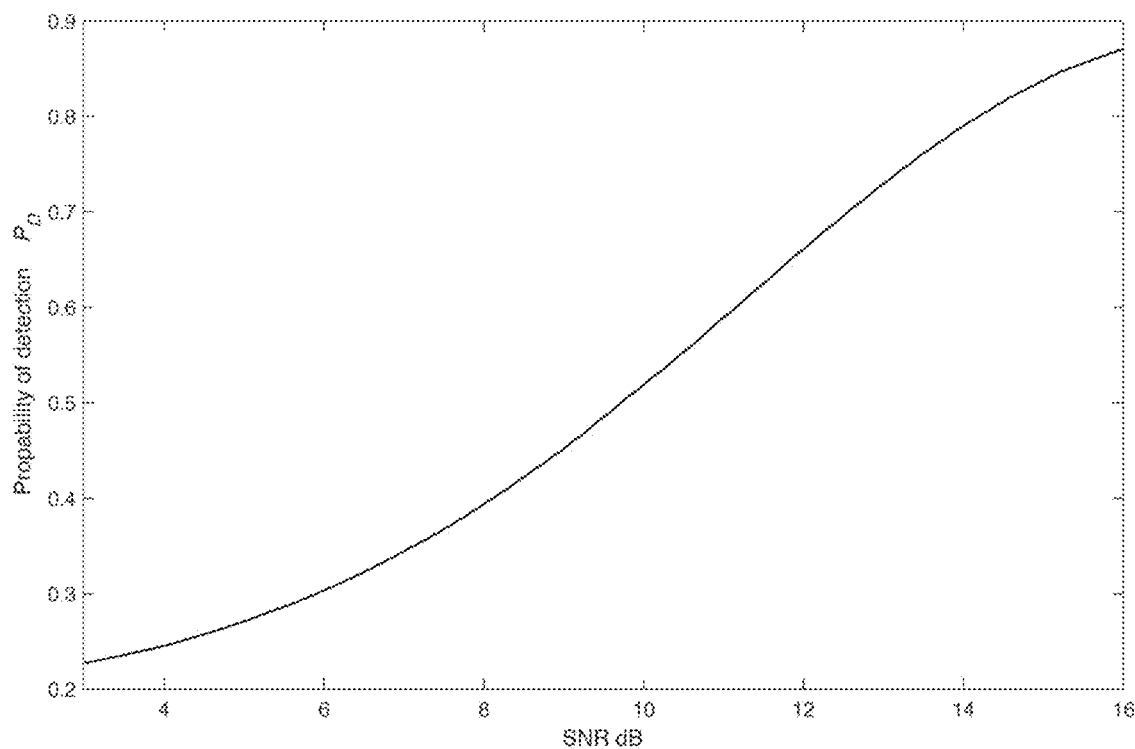
FIG. 5 is a graphical illustration of the detection probability of the number of active devices as a function of SNR, in accordance with an embodiment of the present invention.

The probability of correct detection of the number of active users as a function of the SNR for $P_{FA}$=0.1 is shown in FIG. 5. It can be seen that the detection performance increases monotonically and smoothly with increasing SNR.

In accordance with an exemplary embodiment, the simulation results are presented to evaluate the throughput performance of the SAN protocol. Throughout the simulation, it is assumed that there is one IoT gateway with a single antenna and a total of M IoT devices. A binomial distribution is considered to model the random number of active IoT devices N, each with a probability of transmission $p_T$.

$$P_T(N; p_T, M) = \binom{M}{N} p_T^N (1 - p_T)^{M-N} \quad (10)$$

Figure 6:
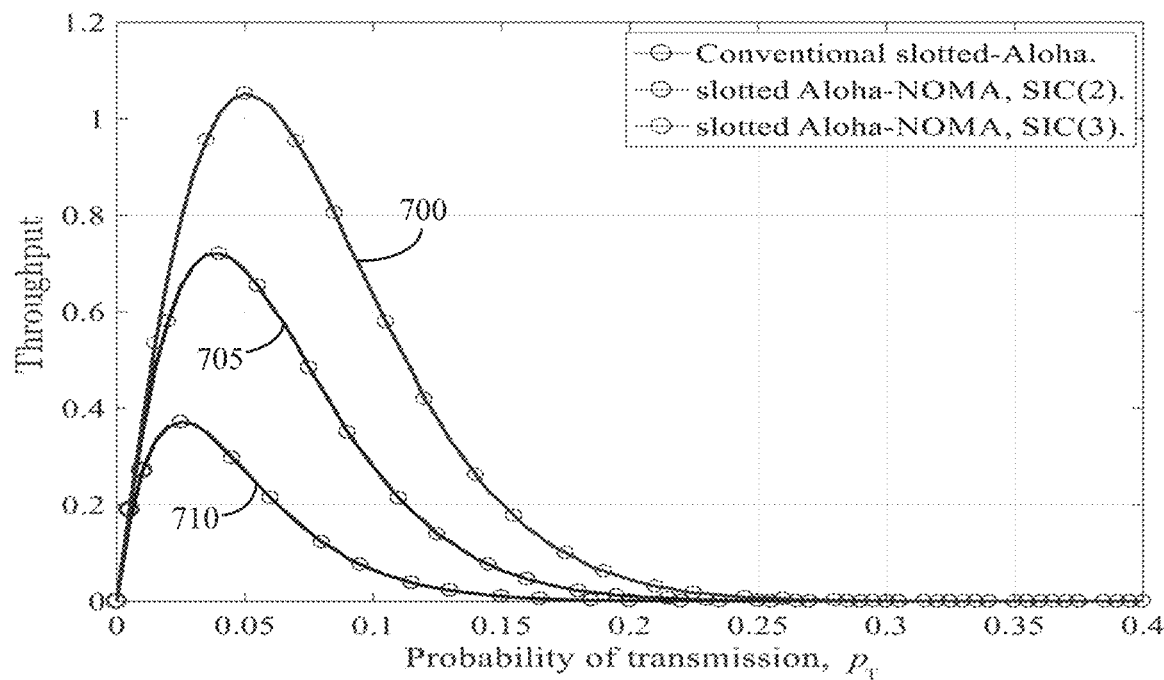
FIG. 6 is a graphical illustration of the throughput of SA vs. SAN for different values of probability of transmission when M=50 and k=3, in accordance with an embodiment of the present invention.

FIG. 6 shows the throughput of SAN for different values of $p_T$ (probability of transmission), M=10 and k=3 attempts for the random selection of distinct optimum power levels. FIG. 6 shows a comparison of throughput for conventional SA 610, SAN using a SIC receiver with 2 optimum power levels 605 and SNA using a SIC receiver with 3 optimum power levels 600. Throughput is the number of successful transmissions for each probability of transmission. As expected, the throughput decreases with increasing probability of transmission. More importantly, the throughput of the SAN protocol is always higher than that of the pure SA protocol. In particular, when the probability of transmission is 0.25, the throughput of SAN with 3 power levels becomes almost 5 times higher than that of (conventional) pure SA. Additionally, SAN is shown to significantly increase the throughput (max of 1.05) compared with 0.36 in SA 610, when using a SIC receiver with 3 optimum power levels for a total number of 60 IoT devices. This demonstrates that NOMA with a SIC receiver 600, 605 can help improve the throughput of pure SA, especially when the IoT devices are active.

Figure 7:
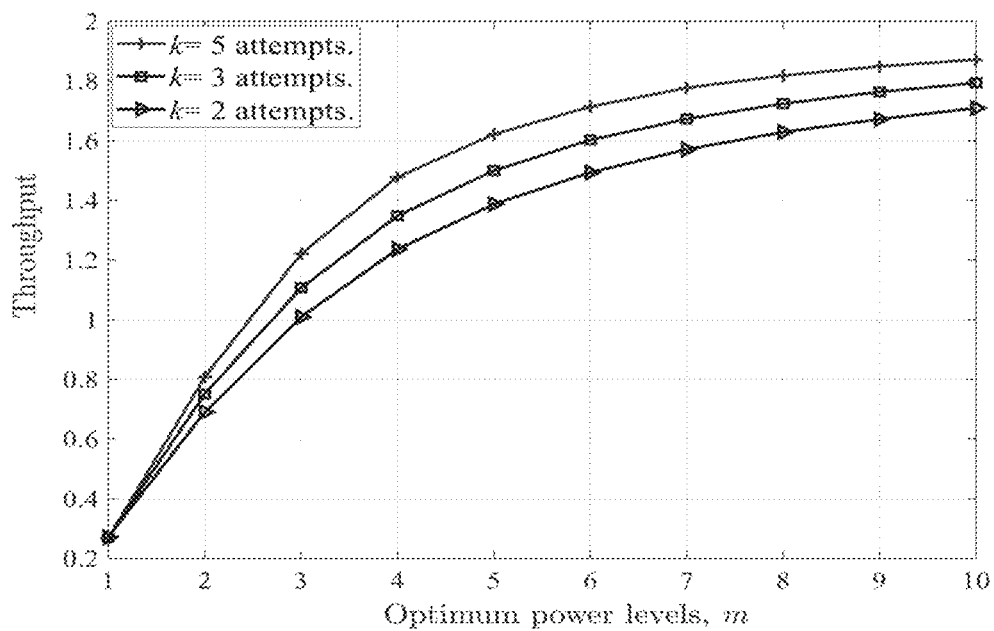
FIG. 7 is a graphical illustration of the throughput of SAN for different optimum power levels when k=2, 3 and 5 and M=10, in accordance with an embodiment of the present invention.

In order to see the impact of the number of optimum power levels on the throughput of SAN, the throughput of SAN for different power levels is shown in FIG. 7. For M=10, k=3, k=2, k=1 and probability of transmission of 0.25. As shown, the throughput of SAN increases with the increase in optimum power levels (SIC degree). For example, SAN with 3 power levels has a higher throughput than SAN with 2 power levels. However, the throughput improvement becomes insufficient for optimum power levels greater than 5 (saturation in the throughput gain). Also, the simulation results in FIG. 7, shows the impact of the number of attempts k, for picking distinct optimum power levels, on throughput for different optimal power levels. The more attempts allowed for picking the optimum power levels, the higher the throughput that can be achieved at the cost of increased delay.

Figure 8:
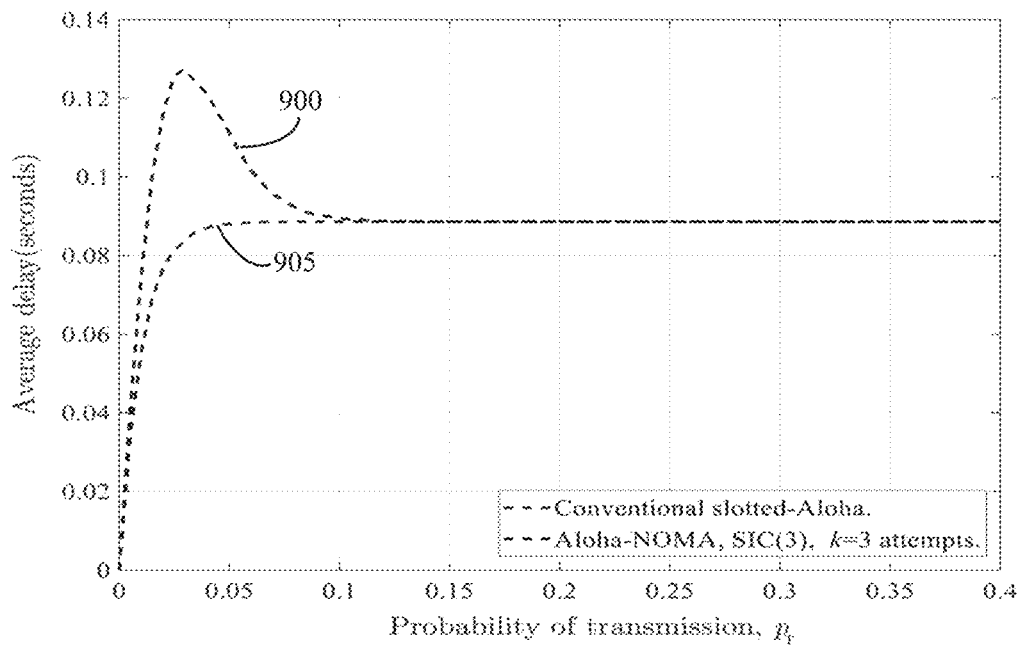
FIG. 8 is a graphical illustration comparing the average channel access delay based upon the probability of transmission for conventional SA and SAN, in accordance with an embodiment of the present invention.

As shown in FIG. 8, at a low probability of transmission, the SAN protocol 805 of the present invention has a larger average channel access delay compared with conventional SA protocol 800. Additionally, at a high probability of transmission, both SAN 805 and SA 800 deliver the same average channel access delay.

The present invention provides an enhancement of the recently proposed SAN MAC layer protocol that is easy to implement, energy efficient, scalable and compatible with the low complexity requirements of IoT devices. The synergistic combination of SA protocol with NOMA and SIC receivers was demonstrated to significantly improve the throughput performance with respect to the SA protocol. In various embodiments, the present invention enhances the SAN protocol by providing the IoT gateway a means to determine the number of active IoT devices in the medium. Knowing the number of active IoT devices is essential in order to optimize the SIC power levels and the ability to distinguish between signals from different IoT devices transmitting on the same time and frequency. In the case of a massive number of active IoT devices, the power levels become high, whereas the IoT devices usually have limited power capabilities. Therefore, in the present invention, the number of active devices that can achieve a successful transmission using SIC is limited to keep the power levels modest. It was shown that with correct detection, there is a substantial throughput gain of 5.5

Hardware and Software Infrastructure Examples

The present invention may be embodied on various computing platforms that perform actions responsive to software-based instructions and most particularly on touch-screen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

What is claimed is:

1. A method for Machine-to-Machine (M2M) communication over a transmission medium, the method comprising:
   broadcasting a notification signal, from an Internet of Things (IoT) gateway, to notify a plurality of IoT devices that the IoT gateway is available to receive transmission packets over the transmission medium;
   transmitting a training sequence over the transmission medium from each active IoT device of the plurality of devices in response to the notification signal;
   receiving a superposed signal at the IoT gateway, wherein the superposed signal comprises each of the training sequences transmitted from each active IoT device;
   determining, by the IoT gateway, a number of active IoT devices based upon the received superposed signal;
   if the number of active IoT devices is less than or equal to a maximum number of optimum power levels of a Successive Interference Cancellation (SIC) receiver of the IoT gateway, setting a number of optimum power levels of the SIC receiver to be equal to the number of active IoT devices; and
   broadcasting, by the IoT gateway, the number of optimum power levels of the SIC receiver to the active IoT devices.

2. The method of claim 1, further comprising, if the number of active IoT devices is greater than a maximum number of optimum power levels of the SIC receiver:
   aborting, by the IoT gateway, the setting of the number of optimum power levels of the SIC receiver; and
   broadcasting, by the IoT gateway, a next notification signal comprising a random back-off request, to notify the plurality of IoT devices that the IoT gateway is available to receive transmission packets over the transmission medium and to request that the active IoT devices utilize a random back-off in a next transmission of the training sequence over the transmission medium.

3. The method of claim 1, further comprising:
   receiving, at each of the active IoT devices, the number of optimum power levels of the SIC receiver;
   selecting, by each of the active IoT devices, one of the optimum power levels of the SIC receiver and one of a plurality of receiving antennas of the SIC receiver;
   transmitting, by each of the active IoT devices, a device identification associated with the active IoT device and a payload, the payload comprising the selected optimum power level of the SIC receiver and the selected receiving antenna of the SIC receiver;
   receiving, at the SIC receiver, the device identification and the payload from each of the active IoT devices;
   determining if the selected optimum power level of each of the active IoT devices is distinct; and
   establishing a connection between each of the active IoT devices and the SIC receiver if the selected optimum power level of each of the active IoT devices is distinct.

4. The method of claim 3, further comprising:
   not establishing a connection between each of the active IoT devices and the SIC receiver if the selected optimum power level of each of the active IoT devices is not distinct;
   transmitting a reselect signal, from the IoT gateway, to each of the active IoT devices to reselect an optimum power level and a receiving antenna;
   reselecting, by each of the active IoT devices, one of the optimum power levels of the SIC receiver and one of a plurality of receiving antennas of the SIC receiver;
   transmitting, by each of the active IoT devices, a device identification associated with the active IoT device and a reselected payload, the payload comprising a reselected optimum power level of the SIC receiver and the selected receiving antenna of the SIC receiver;
   transmitting, by each of the active IoT devices, the device identification associated with the active IoT device and the reselected payload;
   receiving, at the SIC receiver, the device identification and the reselected payload for each of the active IoT devices;
   determining if the reselected optimum power level of each of the active IoT devices is distinct;
   repeating transmitting a reselect signal from the IoT gateway, reselecting one of the optimum power levels, transmitting a reselected payload comprising the reselected optimum power level, receiving the device identification and the reselected payload for each of the active IoT devices at the SIC receiver and determining if the reselected optimum power level of each of the active IoT devices is distinct until the reselected optimum power each of the active IoT devices is determined to be distinct or until a maximum number of attempts has been exceeded; and
   transmitting, from the IoT gateway a negative-acknowledgement signal to each of the active IoT devices instructing each of the IoT devices to utilize a random back-off in a next transmission of the training sequence over the transmission medium when a maximum number of attempts has been exceeded.

5. The method of claim 1, wherein determining, by the IoT gateway, a number of active IoT devices further comprises, utilizing multi-hypothesis testing of the received superposed signal to determine the number of active IoT devices.

6. A system for Machine-to-Machine (M2M) communication over a transmission medium, the system comprising:
   an IoT gateway broadcasting a notification signal over a transmission medium to notify a plurality of IoT devices that the IoT gateway is available to receive transmission packets over the transmission medium;
   a plurality of IoT devices, each active IoT device of the plurality of IoT devices receiving the notification signal and transmitting a training sequence in response to receiving the notification signal;
   the IoT gateway receiving a superposed signal, wherein the superposed signal comprises the training sequence transmitted from each active IoT device of the plurality of IoT devices;
   the IoT gateway determining a number of active IoT devices based upon the received superposed signal, setting a number of optimum power levels of a Successive Interference Cancellation (SIC) receiver of the IoT gateway to be equal to the number of active IoT devices, if the number of active IoT devices is less than or equal to a maximum number of optimum power levels of the SIC receiver; and
   the IoT gateway broadcasting the number of optimum power levels of the SIC receiver to the active IoT devices.

7. The system of claim 6, wherein the IoT gateway further:
   aborting the setting of the number of optimum power levels of the SIC receiver if the number of active IoT devices is greater than a maximum number of optimum power levels of the SIC receiver; and broadcasting a next notification signal comprising a random back-off request, to notify the plurality of IoT devices that the IoT gateway is available to receive transmission packets over the transmission medium and to request that the active IoT devices utilize a random back-off in a next transmission of the training sequence over the transmission medium.

8. The system of claim 6, wherein the IoT gateway further:
receiving, from each active IoT device, a device identification associated with the active IoT device and a payload, the payload comprising a selected optimum power level of the SIC receiver and a selected receiving antenna of the SIC receiver;
determining if the selected optimum power level of each of the active IoT devices is distinct; and
establishing a connection between each of the active IoT devices and the SIC receiver if the selected optimum power level of each of the active IoT devices is distinct.

9. The system of claim 8, wherein the IoT gateway further:
not establishing a connection between each of the active IoT devices and the SIC receiver if the selected optimum power level of each of the active IoT devices is not distinct;
transmitting a reselect signal, from the IoT gateway, to each of the active IoT devices to reselect an optimum power level and a receiving antenna of the SIC receiver;
receiving, from each of the active IoT devices, a device identification associated with the active IoT device and a reselected payload at the SIC receiver, the reselected payload comprising a reselected optimum power level of the SIC receiver and the selected receiving antenna of the SIC receiver;
determining if the reselected optimum power level of each of the active IoT devices is distinct;
repeating transmitting a reselect signal from the IoT gateway, receiving a device identification and a reselected payload from each of the active IoT devices at the SIC receiver and determining if the reselected optimum power level of each of the active IoT devices is distinct until the reselected optimum power each of the active IoT devices is determined to be distinct or until a maximum number of attempts has been exceeded; and
transmitting a negative-acknowledgement signal to each of the active IoT devices instructing each of the IoT devices to utilize a random back-off in a next transmission of the training sequence over the transmission medium if the maximum number of attempts is exceeded.

10. The system of claim 6, wherein the IoT gateway utilizing multi-hypothesis testing of the received superposed signal to determine the number of active IoT devices.

11. An IoT gateway for Machine-to-Machine (M2M) communication over a transmission medium, the IoT gateway:
broadcasting a notification signal to notify a plurality of IoT devices that the IoT gateway is available to receive transmission packets over the transmission medium;
receiving a superposed signal at the IoT gateway, wherein the superposed signal comprises a training sequence transmitted from each active IoT device of a plurality of IoT devices in response to the notification signal;
determining a number of active IoT devices based upon the received superposed signal;
if the number of active IoT devices is less than or equal to a maximum number of optimum power levels of a Successive Interference Cancellation (SIC) receiver of the IoT gateway, setting a number of optimum power levels of the SIC receiver to be equal to the number of active IoT devices; and
broadcasting the number of optimum power levels of the SIC receiver to the active IoT devices.

12. The IoT gateway of claim 11, further:
if the number of active IoT devices is greater than a maximum number of optimum power levels of the SIC receiver:
aborting the setting of the number of optimum power levels of the SIC receiver; and
broadcasting a next notification signal comprising a random back-off request, to notify the plurality of IoT devices that the IoT gateway is available to receive transmission packets over the transmission medium and to request that the active IoT devices utilize a random back-off in a next transmission of the training sequence over the transmission medium.

13. The IoT gateway of claim 11, further:
receiving, at the SIC receiver of the IoT gateway, a device identification and a payload from each of the active IoT devices, wherein the payload comprises a selected optimum power level of the SIC receiver and a selected receiving antenna of the SIC receiver of the active IoT device based upon the optimum power levels of the SIC receiver;
determining if the selected optimum power level of each of the active IoT devices is distinct; and
establishing a connection between each of the active IoT devices and the SIC receiver if the selected optimum power level of each of the active IoT devices is distinct.

14. The IoT gateway of claim 13, further:
not establishing a connection between each of the active IoT devices and the SIC receiver if the selected optimum power level of each of the active IoT devices is not distinct;
transmitting a reselect signal to each of the active IoT devices to reselect an optimum power level and a receiving antenna;
receiving, at the SIC receiver of the IoT gateway, the device identification and a reselected payload for each of the active IoT devices;
determining if the reselected optimum power level of each of the active IoT devices is distinct;
repeating transmitting a reselect signal, receiving the device identification and the reselected payload for each of the active IoT devices at the SIC receiver and determining if the reselected optimum power level of each of the active IoT devices is distinct until the reselected optimum power each of the active IoT devices is determined to be distinct or until a maximum number of attempts has been exceeded; and
transmitting, from the IoT gateway a negative-acknowledgement signal to each of the active IoT devices instructing each of the IoT devices to utilize a random back-off in a next transmission of the training sequence over the transmission medium when a maximum number of attempts has been exceeded.

15. The IoT gateway of claim 11, wherein determining a number of active IoT devices further comprises, utilizing multi-hypothesis testing of the received superposed signal to determine the number of active IoT devices.

16. One or more non-transitory computer-readable media having computer-executable instructions for performing a method of running a software program on a computing device, the computing device operating under an operating system, the method including issuing instructions from the software program comprising:

broadcasting a notification signal to notify a plurality of IoT devices that an IoT gateway is available to receive transmission packets over the transmission medium; receiving a superposed signal comprising a training sequence transmitted by each active IoT device of the plurality of IoT devices in response to the notification signal; determining a number of active IoT devices based upon the received superposed signal; setting a number of optimum power levels of a Successive Interference Cancellation (SIC) receiver to be equal to the number of active IoT devices if the number of active IoT devices is less than or equal to a maximum number of optimum power levels of the SIC receiver; and broadcasting the number of optimum power levels of the SIC receiver to the active IoT devices.

17. The non-transitory computer-readable media of claim 16, further for performing, aborting, by the IoT gateway, the setting of the number of optimum power levels of the SIC receiver if the number of active IoT devices is greater than a maximum number of optimum power levels of the SIC receiver; and broadcasting a next notification signal, comprising a random back-off request, to notify the plurality of IoT devices that the IoT gateway is available to receive transmission packets over the transmission medium and to request that the active IoT devices utilize a random back-off in a next transmission of the training sequence over the transmission medium.

18. The non-transitory computer-readable media of claim 16, further for performing, receiving, from each active IoT device, a device identification associated with the active IoT device and a payload, the payload comprising a selected optimum power level of the SIC receiver and a selected receiving antenna of the SIC receiver; for determining if the selected optimum power level of each of the active IoT devices is distinct; and for establishing a connection between each of the active IoT devices and the SIC receiver if the selected optimum power level of each of the active IoT devices is distinct.

19. The non-transitory computer-readable media of claim 18, further for performing, not establishing a connection between each of the active IoT devices and the SIC receiver if the selected optimum power level of each of the active IoT devices is not distinct; for transmitting a reselect signal to each of the active IoT devices to reselect an optimum power level and a receiving antenna; for receiving, from each of the active IoT devices, a device identification associated with the active IoT device and a reselected payload at the SIC receiver, the reselected payload comprising a reselected optimum power level of the SIC receiver and the selected receiving antenna of the SIC receiver;

for determining if the reselected optimum power level of each of the active IoT devices is distinct; for repeating transmitting a reselect signal from the IoT gateway, receiving a device identification and a reselected payload from each of the active IoT devices at the SIC receiver and determining if the reselected optimum power level of each of the active IoT devices is distinct until the reselected optimum power each of the active IoT devices is determined to be distinct or until a maximum number of attempts has been exceeded;

and for transmitting a negative-acknowledgement signal to each of the active IoT devices instructing each of the IoT devices to utilize a random back-off in a next transmission of the training sequence over the transmission medium if the maximum number of attempts is exceeded.

20. The non-transitory computer-readable media of claim 16, wherein determining, by the IoT gateway, a number of active IoT devices further comprises, utilizing multi-hypothesis testing of the received superposed signal to determine the number of active IoT devices.

* * * * *